A. W. WEIKERT.
ANIMAL MUZZLE.
APPLICATION FILED FEB. 15, 1916.

1,179,149.  Patented Apr. 11, 1916.

Inventor
Alvin W. Weikert
By Chas. E. Riordan
Attorney

UNITED STATES PATENT OFFICE.

ALVIN W. WEIKERT, OF WASHINGTON, DISTRICT OF COLUMBIA, ASSIGNOR OF ONE-HALF TO HARRY WILLIAMS, OF WASHINGTON, DISTRICT OF COLUMBIA.

ANIMAL-MUZZLE.

1,179,149.  Specification of Letters Patent.  Patented Apr. 11, 1916.

Application filed February 15, 1916. Serial No. 78,359.

*To all whom it may concern:*

Be it known that I, ALVIN W. WEIKERT, a citizen of the United States, residing at Washington, in the District of Columbia, have invented a new and useful Improvement in Animal-Muzzles, of which the following is a specification.

This invention relates to muzzles for animals and is especially designed for dogs.

The muzzle is constructed so as to make it impossible for a dog wearing the same to bite no matter in what position he holds his head. At the same time, provision is made for permitting the dog to eat and drink while the muzzle is attached to his head.

A further object is to prevent the muzzle from being thrown upward far enough to allow the dog to bite after he has raised the device to the point where he is able to eat and drink.

Another object is to provide a muzzle which may be adjusted to closely fit dogs with heads of different sizes.

Other objects will appear as the description proceeds.

The invention will be first hereinafter described in connection with the accompanying drawings, which constitute part of this specification, and then more specifically defined in the claims at the end of the description.

Figure 1:
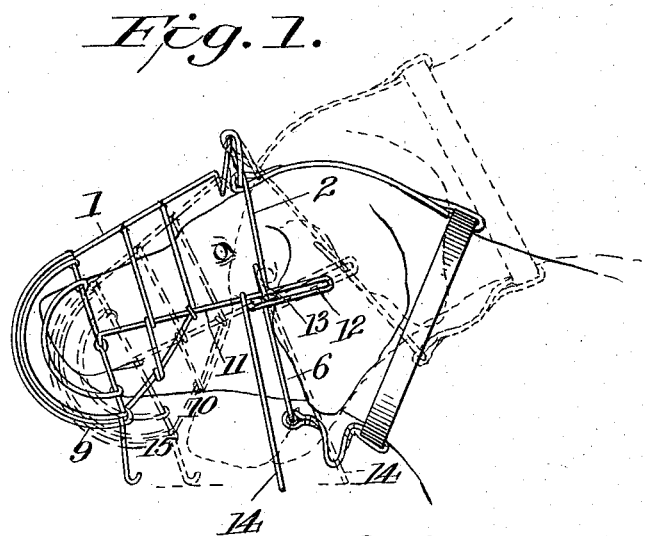
Figure 2:
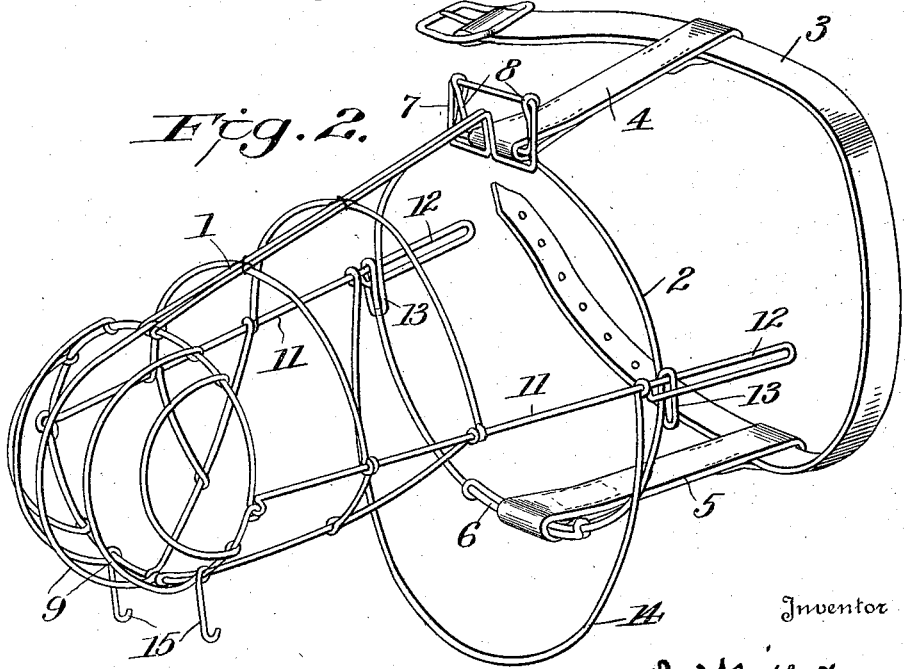

In the accompanying drawings, wherein similar reference characters are used to designate corresponding parts in the several views: Figure 1 is a side view of a muzzle constructed substantially in accordance with the present invention, the same being shown as normally arranged on a dog's head, the position of the muzzle when the dog is eating or drinking being indicated in dotted lines, and Fig. 2 is a perspective view of the muzzle.

The muzzle comprises a cage 1, preferably made of rigid wire, an adjustable ring 2 adapted to fit around the head of a dog just in front of his ears, as illustrated in Fig. 1, a strap 3, to be secured around the neck behind the ears, and connecting straps 4 and 5 between the ring 2 and strap 3. The upper connecting strap 4 is preferably attached to the upper portion of the ring 2, while the other connecting strap 5 is attached to the lower portion of said ring and preferably embraces the adjustable overlapping portions 6 of said ring. These overlapping portions 6 are adapted to slide on one another for varying the diameter of the ring 2 to fit dogs having heads of different sizes.

The cage 1 is hinged at 7 to the upper portion of the ring 2, said ring being provided with a pair of upwardly extending arms 8 between which the strap 4 is passed. These arms 8 serve to position the hinge 7 above the ring 2 and to retain the strap 4 in proper position.

The cage 1 covers the upper portion of the dog's head and at the front end normally extends below his mouth as at 9. This downwardly extending front portion 9 terminates a short distance below the mouth, leaving an open space 10 at the bottom of the cage extending rearwardly from said front end portion 9.

The cage structure includes longitudinal side wires 11 having elongated loops 12 at their rear ends engaging with loops 13 at the sides of the ring 2. The loops 12 are arranged longitudinally of the cage, while the loops 13 are disposed transversely thereof. These interengaging loops permit the cage to be swung upwardly on the hinge 7 to a limited degree, determined by the length of the loops 12. When the rear ends of the loops 12 engage the loops 13, the upward movement of the cage is arrested, and this will occur before the cage is raised far enough to allow the dog to bite through the open space 10. As a further precaution against the cage being thrown upward too far, a looped wire 14 is suspended at its opposite ends from the side wires 11 and extend below the dog's jaw.

When the dog wishes to eat or drink and lowers his head for that purpose, the ring 2 is swung rearwardly, permitting him to withdraw his mouth from the inclosing front end portion 9 of the cage and project it through the open space 10 between the looped wire 14 and the pair of rigid supports 15 depending from the rear lower extremity of the inclosing end portion 9 of the cage and designed to rest upon the ground or floor for supporting the cage in raised position while the dog is eating or drinking. The looped wire 14 also serves to restrict the open portion 10 at the bottom of the cage and prevent the dog from opening his mouth wide enough to bite. When the dog raises his head again, the weight of the front end portion of the cage will cause said cage to drop back to the solid line position shown in Fig. 1 where his mouth is inclosed by the front portion 9.

Having thus described my invention, what I claim as new and desire to secure by Letters Patent is:

1. In a muzzle of the character described, the combination, with a cage for normally inclosing an animal's mouth, of a ring to fit around the animal's head and to which the cage is hinged, longitudinally extending loops on the sides of the cage, and transversely arranged loops on the sides of the ring with which the loops on the cage have sliding connection for limiting the movement of the cage.

2. In a muzzle of the character described, the combination with a cage for normally inclosing an animal's mouth, of a ring to fit around the animal's head, spaced upwardly extending lugs on the top portion of the ring to which the cage is hinged, and means for securing the ring in place including a strap passed around said ring between said lugs and retained in position thereby.

3. In a muzzle of the character described, the combination with a cage for normally inclosing an animal's mouth, of a ring to fit around the animal's head and to which the cage is hinged, said ring having overlapping end portions for varying the diameter of the ring to fit heads of different sizes, and means for securing said ring in place including a strap embracing said overlapping end portions of the ring.

In testimony whereof I have hereunto set my hand this 14th day of February, 1916.

ALVIN W. WEIKERT.

Copies of this patent may be obtained for five cents each, by addressing the "Commissioner of Patents, Washington, D. C."